(12) United States Patent
Prabhakar et al.

(10) Patent No.: US 11,981,240 B2
(45) Date of Patent: May 14, 2024

(54) CONTROLLING TEMPERATURE INSIDE A RECEPTACLE IN A VEHICLE

(71) Applicant: L&T TECHNOLOGY SERVICES LIMITED, Chennai (IN)

(72) Inventors: Hariprasad V Prabhakar, Thiruvananthapuram (IN); Ratheesh Kizhakke Valappil, Thiruvananthapuram (IN); Ashish Singh, Bhopal (IN)

(73) Assignee: L&T TECHNOLOGY SERVICES LIMITED, Tamil Nadu (IN)

( * ) Notice: Subject to any disclaimer, the term of this patent is extended or adjusted under 35 U.S.C. 154(b) by 526 days.

(21) Appl. No.: 17/280,893

(22) PCT Filed: Sep. 27, 2019

(86) PCT No.: PCT/IB2019/058256
§ 371 (c)(1),
(2) Date: Mar. 28, 2021

(87) PCT Pub. No.: WO2020/065623
PCT Pub. Date: Apr. 2, 2020

(65) Prior Publication Data
US 2022/0001785 A1    Jan. 6, 2022

(30) Foreign Application Priority Data

Sep. 28, 2018  (IN) .............................. 201841036683

(51) Int. Cl.
*B60N 3/10*    (2006.01)
*B60H 1/00*    (2006.01)

(52) U.S. Cl.
CPC ......... *B60N 3/104* (2013.01); *B60H 1/00271* (2013.01)

(58) Field of Classification Search
CPC ....................................................... B60N 3/104
USPC ....................................... 296/24.34; 224/282
See application file for complete search history.

(56) References Cited

U.S. PATENT DOCUMENTS

| | | | |
|---|---|---|---|
| 7,007,494 B2 * | 3/2006 | Al Rashidi | A47J 47/14 165/41 |
| 7,389,650 B2 * | 6/2008 | Kukucka | B60N 3/104 62/457.3 |
| 8,388,040 B2 * | 3/2013 | Bone | B60R 7/06 292/DIG. 22 |

(Continued)

FOREIGN PATENT DOCUMENTS

KR    2014073068 A   *  6/2014   ......... B60H 1/00478

*Primary Examiner* — Amy R Weisberg
*Assistant Examiner* — Veronica M Shull (57) ABSTRACT

This disclosure relates to controlling temperature inside a receptacle 102 in a vehicle. In an embodiment, a temperature-controlled system for a vehicle is disclosed. The temperature-controlled system may include a receptacle 102 having at least one inlet 104, and a housing 106 fitted to the receptacle 102. The housing 106 may include an opening 108. The opening 108 may be configured to be fluidically coupled to a heating, ventilation, and air conditioning (HVAC) vent of the vehicle. The housing 106 may further include an open front face 110 fluidically coupled to the at least one inlet 104 of the receptacle 102, and a gate assembly mounted on the housing 106. The gate assembly 106 may include a gate configured to engage or disengage with the opening 108 to fluidically couple or fluidically decouple, respectively, the opening 108 to the vent.

14 Claims, 8 Drawing Sheets

(56) References Cited

U.S. PATENT DOCUMENTS

| | | | |
|---|---|---|---|
| 9,718,326 B2* | 8/2017 | Wang | B60N 3/104 |
| 2015/0183377 A1* | 7/2015 | Ruffner | B60N 3/101 |
| | | | 296/37.8 |

* cited by examiner

CONTROLLING TEMPERATURE INSIDE A RECEPTACLE IN A VEHICLE

TECHNICAL FIELD

This disclosure relates generally to controlling temperature, and more particularly to a system for controlling temperature inside a receptacle in a vehicle.

BACKGROUND

A vehicle, for example, a car may include a receptacle, such as a cup-holder. In conventional vehicles, this cup-holder is provided either on dashboard, or center console, or doors, or seats, or any other convenient location inside the vehicle. The purpose of the cup-holder is to hold a beverage or a drink in a stationary position, thereby allowing both hands of the driver and other passengers to be free. The cup-holder further minimizes possibility of any spillage when the vehicle accelerates, decelerates, goes over bumps, or makes sharp turns. Therefore, the cup-holders improve the comfort of the driver and the passengers.

However, the beverages or drinks placed in these cup-holders tend to loose or gain heat when left in the cup-holders for an appreciable length of time. This often turns an ice-cold soft drink into a lukewarm drink, especially when the vehicle is being used in summers. Similarly, a hot coffee loses its heat when the vehicle is being used in winters. As many drinks are suitable to be consumed within a predefined temperature range, the drinks may turn unpalatable at a temperature outside that temperature range. As a result, the drinks often get wasted.

Some cup-holders, especially the ones being installed in least vehicle models are equipped with cooling and heating capability, in addition to the cup holding capability. However, these cup-holders lack a suitable arrangement for controlling the cooling and heating of the cup-holders. For example, these cup-holders do not have a convenient arrangement for controlling the flow of cool or heat air into the cup-holder. Hence an improved arrangement for cooling and heating a cup-holder in a vehicle is desired.

SUMMARY

In one embodiment, a housing for controlling temperature inside a receptacle in a vehicle is disclosed. The housing may include an opening at a base of the housing. The opening may be configured to be fluidically coupled to a heating, ventilation, and air conditioning (HVAC) vent of the vehicle. The housing may further include a gate assembly including a gate. The gate may be configured to engage or disengage with the opening to fluidically couple or fluidically decouple, respectively, the opening to the HVAC vent. The housing may further include an open front face configured to be fluidically coupled to at least one inlet of the receptacle.

In another embodiment, a temperature-controlled system for a vehicle is disclosed. The temperature-controlled system may include a receptacle having at least one inlet, a housing fitted to the receptacle, and a gate assembly. The housing may include an opening at a base of the housing. The opening may be configured to be fluidically coupled to a HVAC vent of the vehicle. The housing may further include an open front face fluidically coupled to the at least one inlet of the receptacle. The gate assembly may be mounted on the housing 106. The gate assembly may include a gate configured to engage or disengage with the opening to fluidically couple or fluidically decouple, respectively, the opening to the vent.

In yet another embodiment, a vehicle is disclosed. The vehicle may include a housing configured to be coupled to a receptacle for controlling temperature inside the receptacle. The housing may include an opening at a base of the housing. The opening may be configured to be fluidically coupled to a HVAC vent of the vehicle. The housing may further include a gate assembly. The gate assembly may include a gate configured to engage or disengage with the opening to fluidically couple or fluidically decouple, respectively, the opening to the HVAC vent. The housing may further include an open front face fluidically coupled to the opening. The open front face may be configured to fluidically couple with the receptacle via at let one inlet of the receptacle.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
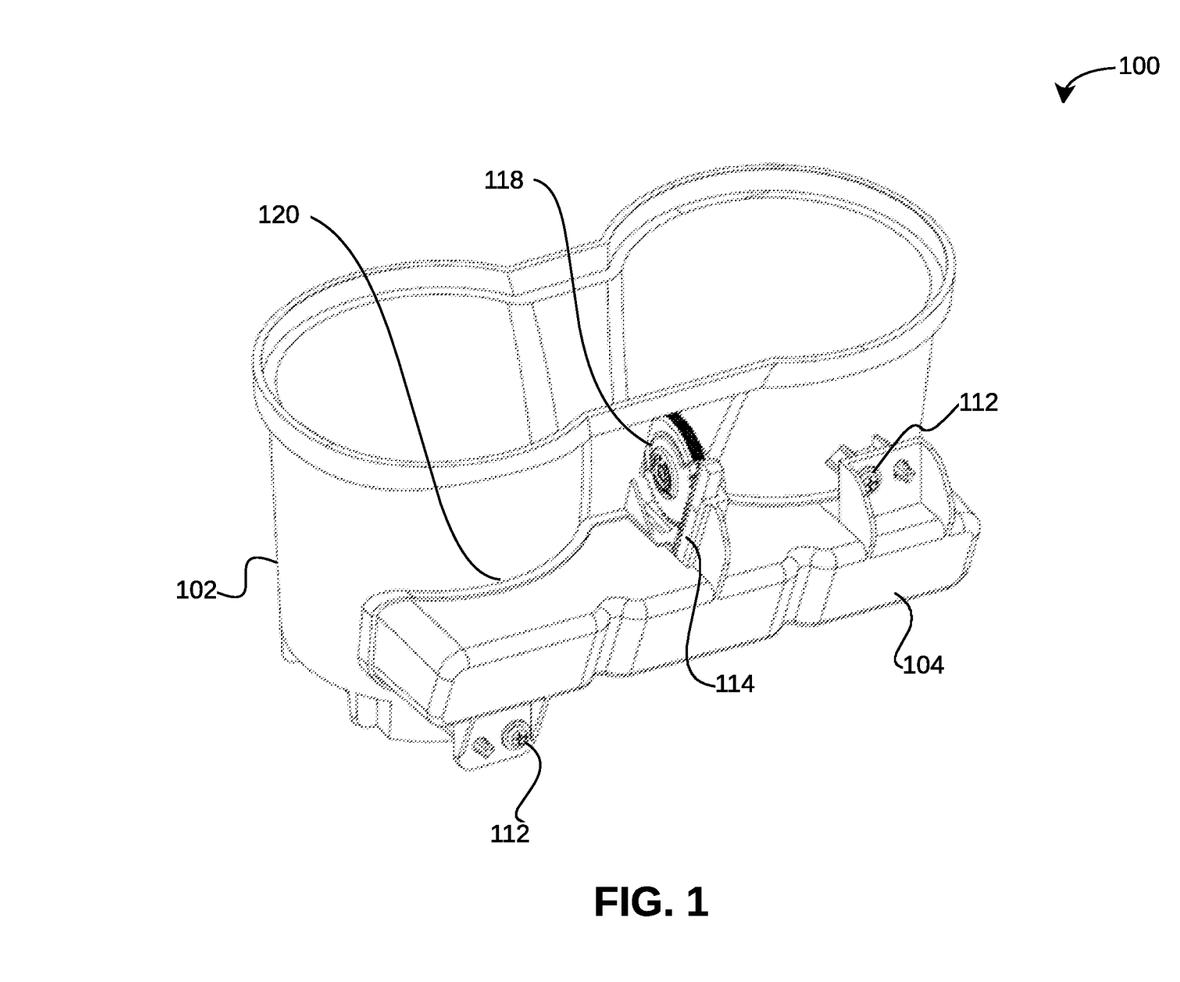
FIG. 1 illustrates an isometric view of a temperature-controlled system, in accordance with an embodiment of the present disclosure.

Referring now to FIG. 1, an isometric view of a temperature-controlled system 100, or simply a system 100, for controlling temperature inside a receptacle 102 in a vehicle is illustrated, in accordance with an embodiment. The system 100 may be implemented in a vehicle having a heating, ventilation, and air conditioning (HVAC) unit capable of cooling and heating the environment within the vehicle. In some embodiments, the system 100 may be used for cooling or heating various types of beverages, such as, but not limited to, soft drinks, coffee, tea etc. The system 100 may maintain an optimum temperature of the beverage, thereby keeping it fresh during the time of ride in the vehicle. The system 100 may be positioned in proximity of an HVAC duct (not shown in the FIG. 1) of the HVAC unit of the vehicle. It may be understood that the HVAC duct may extend from the HVAC unit of the vehicle within the vehicle. For example, the HVAC duct may extend from the HVAC unit installed at the front of the vehicle to one or more rear vents installed in the rear compartment of the of the vehicle. The system 100 may be positioned somewhere on the middle of this HVAC duct.

The system 100 may include a receptacle 102, a housing 106, and a gate assembly. The housing 106 may be configured to be fitted to the receptacle 102. In some embodiments, the receptacle 102 may be a cup holder. It may be understood that the receptacle 102 may not be limited to a cup holder and may as well include any other compartment requiring cooling or heating. The receptacle 102 is further explained in detail in conjunction with FIG. 2.

Figure 2:
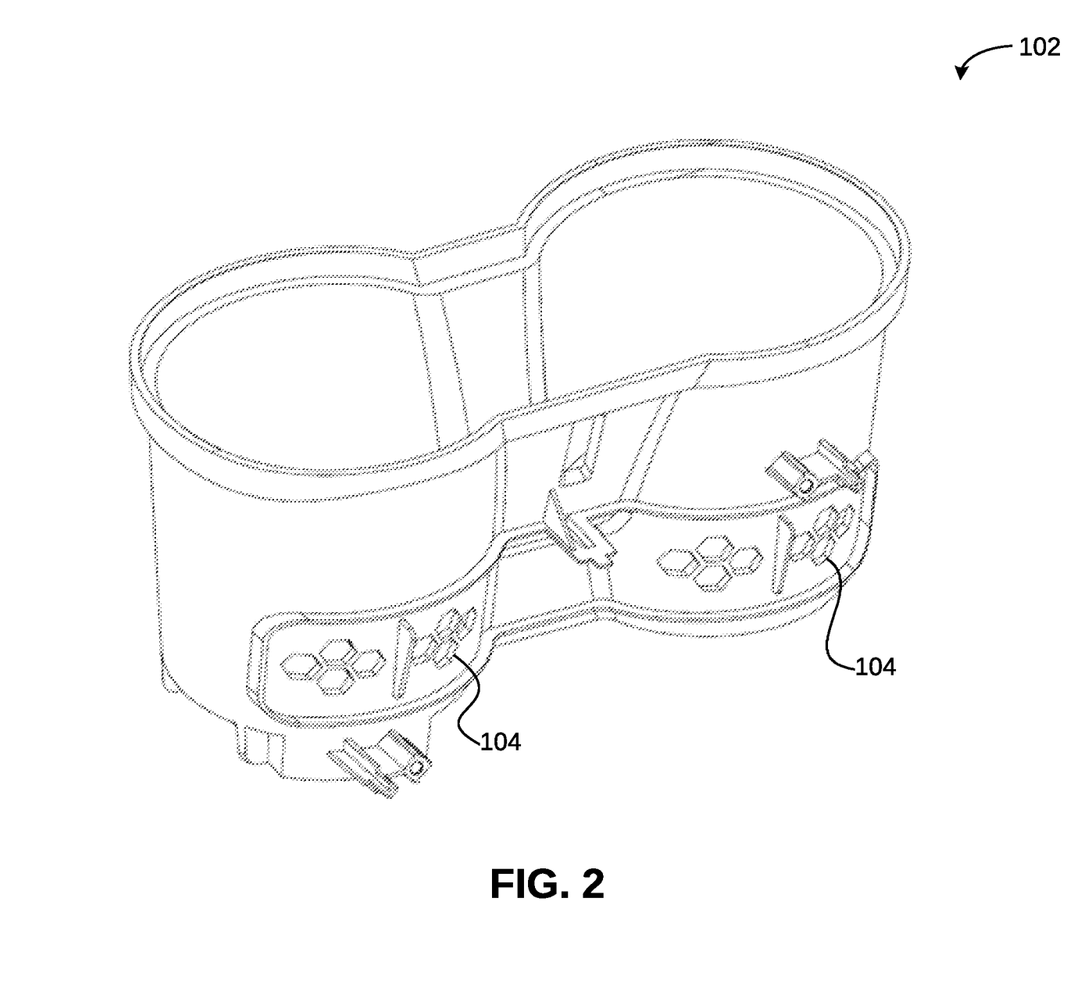
FIG. 2 illustrates an isometric view of a receptacle of a temperature-controlled system, in accordance with an embodiment of the present disclosure.

Referring now to FIG. 2, an isometric view of the receptacle 102 is illustrated, in accordance with an embodiment. In some embodiments, the receptacle 102 may include one or more substantially cylindrical beverage containers. In alternate embodiments, the receptacle 102 may include a compartment for storing food products, for example, fruits, snacks, etc. As it will be appreciated by those skilled in the art, the shape of the receptacle 102 may vary based on the kinds of the beverage or food products to be stored in the receptacle 102. The positioning of the receptacle 102 may be such that an internal surface of the receptacle 102 may be available to a user for keeping the beverage and an external surface may be surrounded by the HVAC duct. The receptacle 102 may be provided at any position inside the vehicle, such as, but not limited to, center console, dashboard, doors etc., where the HVAC duct may be present.

In some embodiments, the receptacle 102 may include at least one inlet 104 from where a warm or a cool air flowing through the HVAC duct may flow into the receptacle 102. It may be noted that the shape and size of the at least one inlet 104 may depend on the amount of cool or warm air to be let into the receptacle 102, i.e. on amount of warming or cooling required.

In some embodiments, the receptacle 102 may include an enclosed region (e.g. a jacket) into which the warm or a cool air flowing entering from the inlet 104 may be circulated. In other words, the warm or cool air may circulate inside the enclosed region and may not exit from the receptacle (a closed air circuit). As such, the enclosed region may form a warmed or cooled jacket. The beverage container (e.g. a bottle) placed in the receptacle may be cooled or warmed by way of the beverage container contacting an outer surface of the warmed or cooled jacket. In alternate embodiments, the warm or a cool air entering from the inlet 104 may fill the receptacle 102 (an open-air circuit). As such, the beverage container placed in the receptacle may be cooled or warmed by way of the warm or cool air directly hitting the beverage container.

The receptacle 102 may be constructed from materials or combination of materials that may include, but are not limited to one or more of a plastic, a fiber, a metal, an alloy and any other suitable material known in the art.

Referring back to FIG. 1, the housing 106 may include an opening 108 at a base of the housing 106. The opening 108 may be configured to be fluidically coupled to the HVAC vent of the vehicle. In other words, the opening 108 may allow passage of warm or cool air from the HVAC vent of the vehicle into the housing 106. The housing 106 may further include an open front face 110 configured to be fluidically coupled to the at least one inlet 104 of the receptacle 102. In other words, the open front face 110 may allow passage of air from the housing 106 to the receptacle 102 via the at least one inlet 104 of the receptacle 102. In some embodiments, the HVAC vent may be positioned on a HVAC duct extending from the HVAC unit of the vehicle to a rear vent of the vehicle. As such, the housing 106 may be configured to be retrofitted in a region proximate to the HVAC vent. The housing 106 is further explained in detail in conjunction with FIG. 3.

Figure 3:
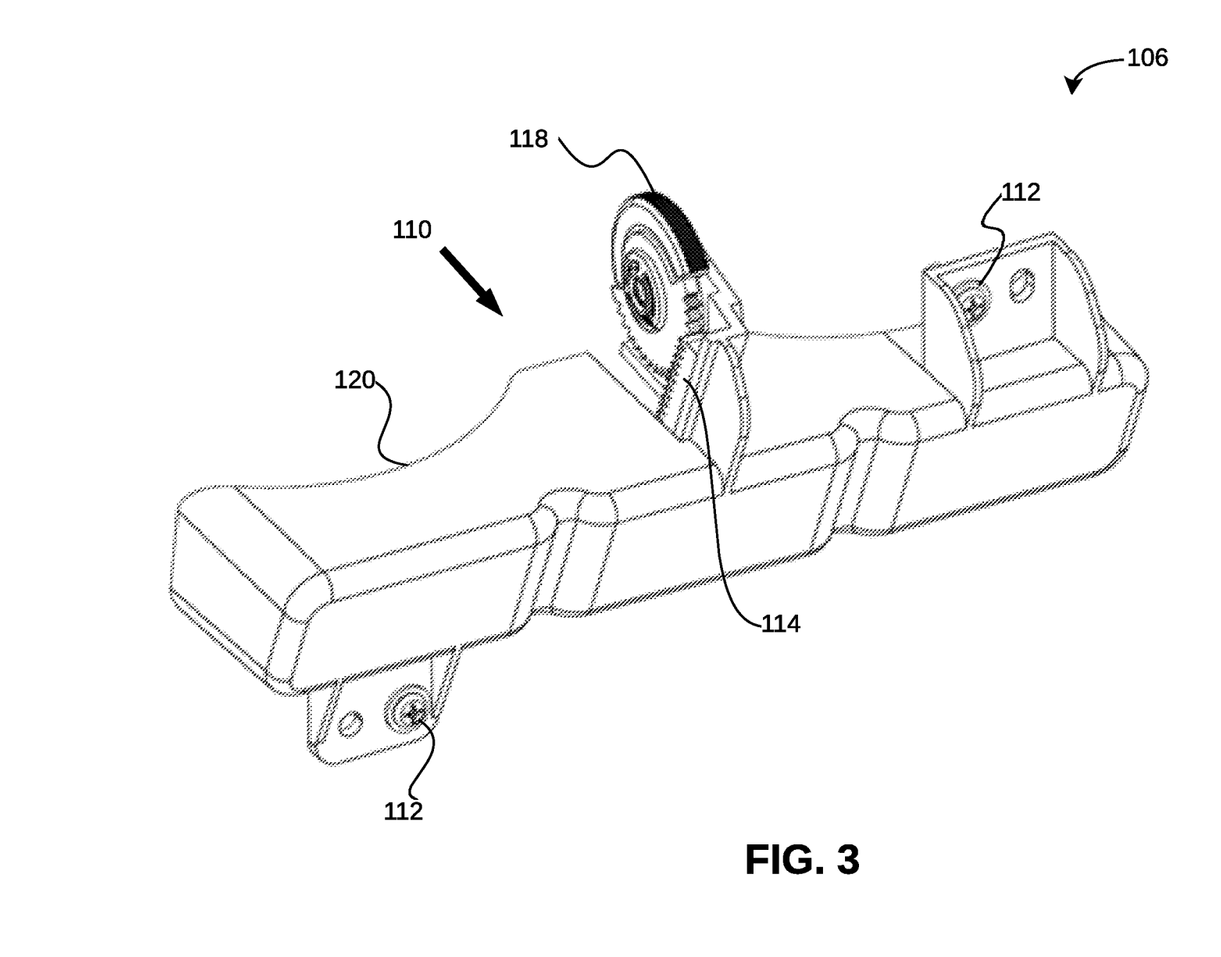
FIG. 3 illustrates an isometric view of a housing for controlling temperature inside a receptacle in a vehicle, in accordance with an embodiment of the present disclosure.

Referring now to FIG. 3, an isometric view of the housing 106 is illustrated, in accordance with an embodiment. In some embodiments, the housing 106 may be configured to be mounted on to the receptacle 102. The housing 106 may be so constructed that the open face 110 of the housing 106 may mount upon the at least one inlet 104 of the receptacle 102, via an interface 120. It may be noted that the mounting between the housing 106 and the receptacle 102 may be such that there is no air leak from the interface 120. In other words, the interface 120 between the housing 106 and the receptacle 102 may be air sealed. By way of an example, the air sealing at the interface 120 may be achieved by placing a gasket between contacting surfaces of the housing 106 and the receptacle 102.

In order to mount the housing 106 on the receptacle 102, the housing 106 may include a provision for mounting the housing 106 to the receptacle 102. By way of an example, the housing 106 may be mounted on the receptacle 102 using a screw or a bolt arrangement 112. As it will be appreciated by a person skilled in the art, shape and size of the housing 106 may depend based on shape and size of the receptacle 102. It may be noted that the housing 106 may be constructed from materials or combination of materials that may include, but are not limited to one or more of a plastic, a fiber, a metal, an alloy and any other suitable material known in the art.

Referring back to FIG. 1, in some embodiments, the gate assembly may be mounted on the housing 106. In some embodiments, the gate assembly may include a gate (not shown in FIG. 1) configured to engage or disengage with the opening 108 to fluidically decouple or fluidically couple, respectively, the opening 108 with the HVAC vent. In other words, when the gate is engaged with the opening 108, the gate may block passage of warm or cool air from the HVAC vent into the housing 106 via the opening 108. Similarly, when the gate is disengaged with the opening 108, the gate may allow passage of warm or cool air from the HVAC vent to the housing 106 via the opening 108.

In some embodiments, the gate assembly may further include a linear member 114 and a circular member 118. The linear member 114 and the circular member 118 may control engaging and disengaging of the gate with the opening 108. For example, the linear member 114 may be configured to move linearly and the circular member 118 may be configured to rotate about an axis. A rotatory motion of the circular member 118 may cause a linear movement of the linear member 114. In some embodiments, the linear member 114 may be fixed to the gate. As such, a rotatory motion of the circular member 118 may cause a linear movement of the gate, thereby causing the gate to engage or disengage with the opening 108, and accordingly, fluidically decoupling or fluidically coupling, respectively, the opening 108 to the HVAC vent.

In some embodiments, the gate assembly may include a rack (a linear gear) and a pinion. The rack may be mechanically coupled to the pinion. For example, the rack and the pinion may include gear teeth, and accordingly, the rack and pinion may engage with each via the gear teeth. Further, in some embodiments, the rack may be fixed to the linear member 114, and the pinion may be fixed to the circular member 118. In alternate embodiments, the rack may be integrated with the linear member 114, and the pinion may be integrated with the circular member 118. In other words, the pinion may itself be the circular member 118, and the rack may itself be the linear member 114. In some embodiments, the linear member 114 may be partly enclosed within the housing 102. In such embodiments, a top portion of the linear member 114 may be outside the housing 106, and a bottom portion of the linear member 114 may be within the housing 106. The system 100 is further explained in detail in conjunction with FIG. 4.

Figure 4:
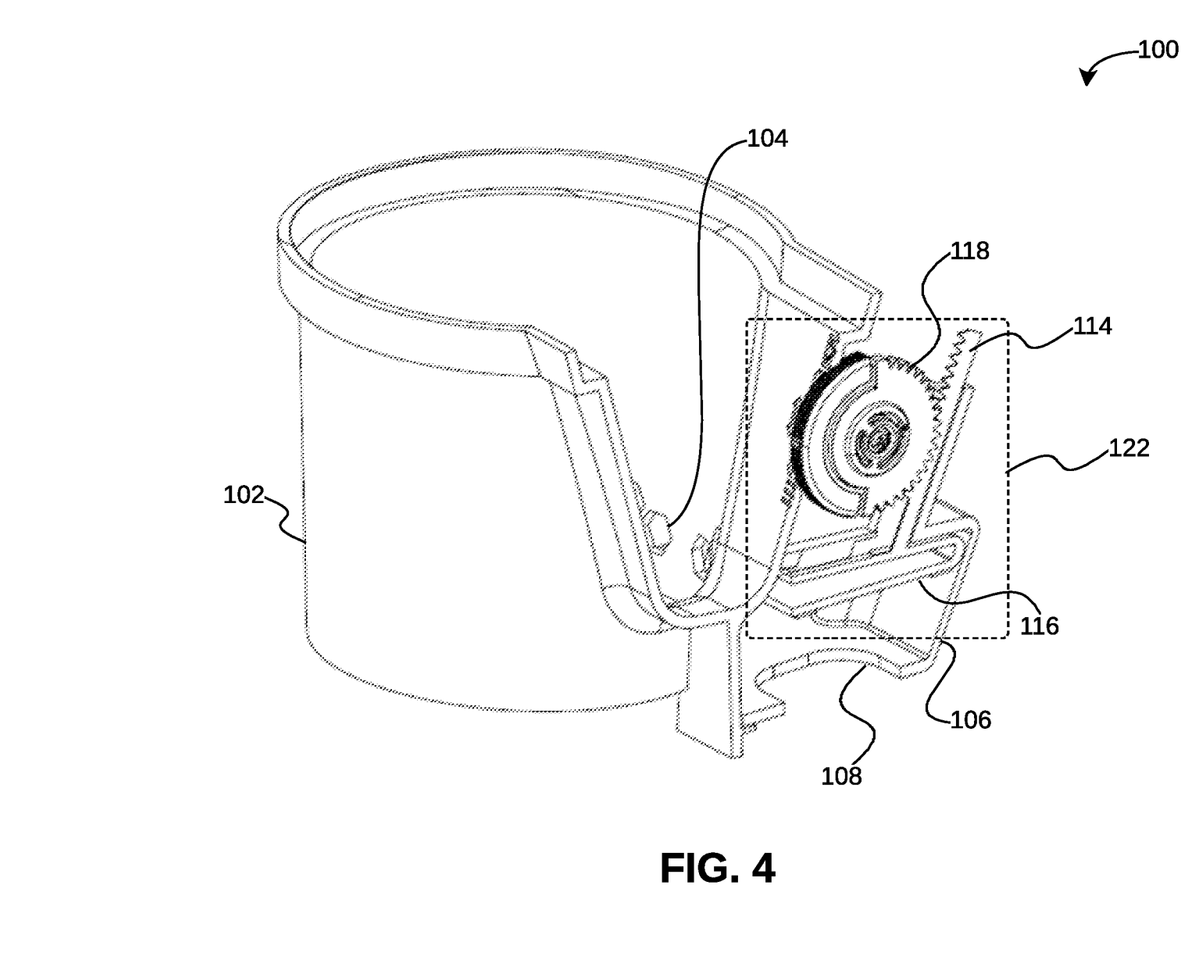
FIG. 4 illustrates a cross-sectional view of a temperature-controlled system, in accordance with another embodiment of the present disclosure.

Referring now to FIG. 4, a cross-sectional view of the system 100 for controlling temperature inside the receptacle 102 in a vehicle is illustrated, in accordance with another embodiment. The system 100 includes the receptacle 102, the housing 106, and the gate assembly 122. As shown in the FIG. 4, the housing 106 is coupled to the receptacle 102. In some embodiments, the housing and the receptacle 102 may be separate units, and the housing 106 may be detachable from the receptacle 102. In some embodiments, the housing 106 may be integrated with the receptacle 102, i.e. the housing 106 and the receptacle 102 may together form a single unit. The housing 106 further includes the opening 108 at a base of the housing 106. The gate assembly 122 may include the linear member 114 and the circular member 118.

The linear member 114 may include an end that may act as gate 116. In other words, the linear member 114 may itself be the gate 116. However, in other embodiments, the linear member 114 may include an attachment which may act as gate 116 and may engage or disengage with the opening 108. The gate 116 may be constructed in such a way that the gate 116 may engage or disengage with the opening 108. In other words, the linear member 114 may engage or disengage with the opening 108 though the end 116. For example, the gate 116 may be a flat shaped extension capable of directing the flow of air into the housing 106 (and then to the receptacle 102) via the opening 108.

The circular member 118 may be mounted in an engaged manner with respect to the linear member 114. The engagement between the circular member 118 and the linear member 114 may be such that the rotation of the circular member 118 may control the engagement and the disengagement of the linear member 114 on the opening 108 at the base of the housing 106. By way of an example, the rotation of the circular member 118 in clockwise direction may engage the linear member 114 on the opening 108, and the rotation of the circular member 118 in anticlockwise direction may disengage the linear member 114 from the opening 108.

The circular member 118 may be rotated using at least one of a manual intervention and an electric switch. In some embodiments, the rotation of the circular member 118 may be achieved manually by a user. By way of an example, at least a portion of the circular member 118 may be exposed so as to be accessed by a user. Further, the exposed portion of the circular member may include a friction surface for allowing a user to rotate the circular member 118 by applying a force with a tip of a finger. In some embodiments, the rotation of the circular member 118 may be actuated by the user through an electric switch. As such, the electric switch may include an electrical arrangement including an electric power source and a controller. A user may trigger the controller to actuate the circular member using electric power from the power source. In some further embodiments, the rotation of the circular member 118 may be actuated by a combination of a manual intervention and an electric switch.

In some embodiments, the circular member 118 may further include a locking arrangement (not shown in FIG. 4) for locking the linear member 114 with respect to the circular member. By way of an example, the locking arrangement of the circular member 118 may include a slot. At both the ends of the slot, the circular member 118 can be secured to lock the linear member 114 with respect to the circular member. It may be understood that by locking the linear member 114 with respect to the circular member, the gate 116 may be locked in an engaged position with the opening 108, so as to fluidically decouple the housing 106 (hence, the receptacle 102) from the HVAC vent.

Figure 5A:
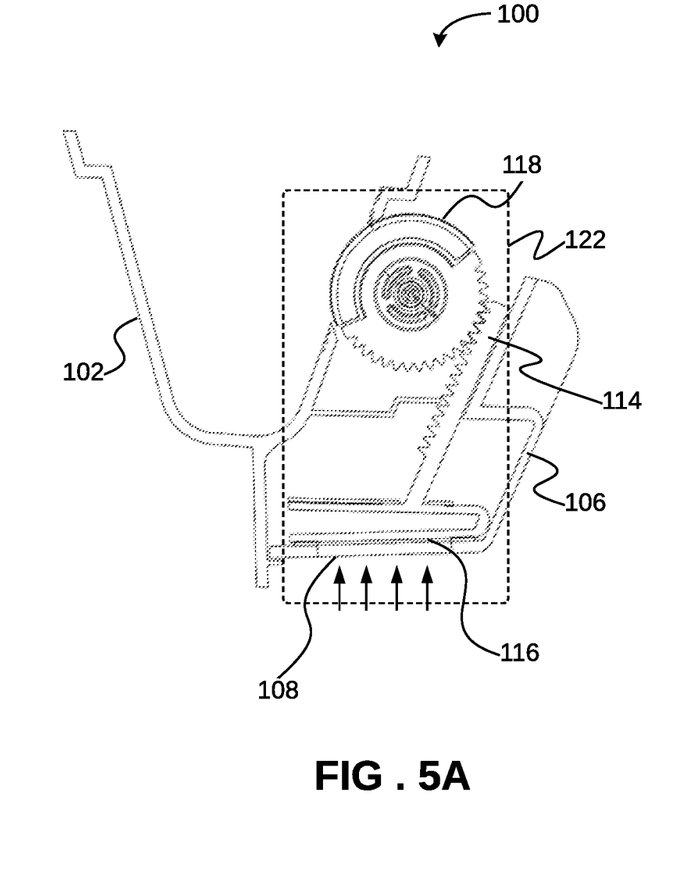
FIGS. 5A-5B illustrate schematic views of a temperature-controlled system, in accordance with some embodiments of the present disclosure.
Figure 5B:
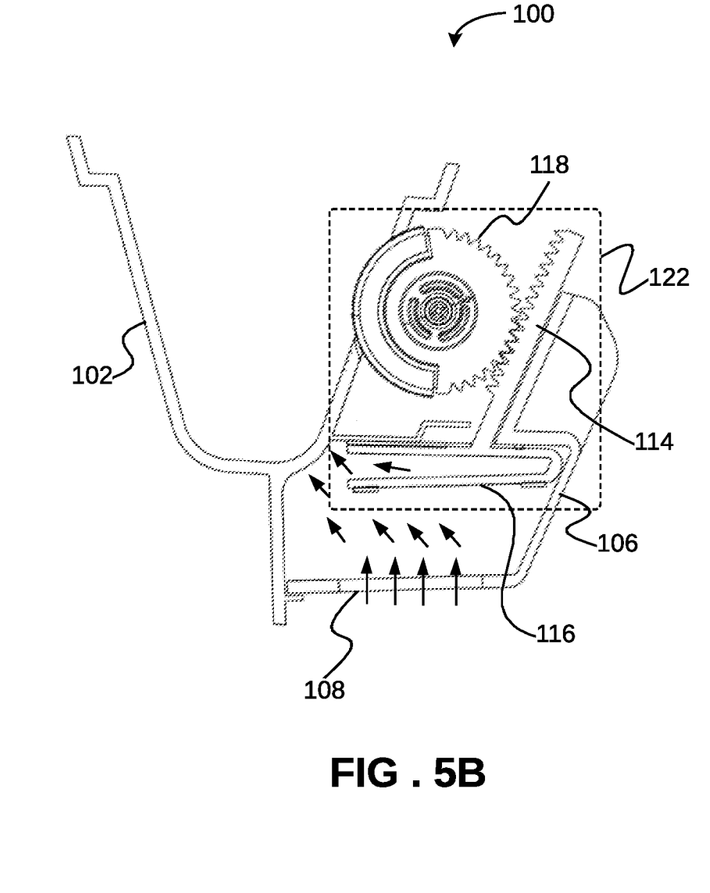

Referring now to FIGS. 5A and 5B, schematic views of the system 100 for controlling temperature inside the receptacle 102 in a vehicle are illustrated, in accordance with some embodiments. As mentioned earlier, in some embodiments, the linear member 114 and the circular member 118 may be a rack and a pinion arrangement. The linear member 114 and the circular member 118 may be arranged in such a way that the teeth of the circular member 118 (pinion) may be engaged to the teeth of the linear member 114 (rack). The circular member 118 may be rotatable in both clockwise and anticlockwise direction. The linear member 114 may further include a gate 116. In some embodiments, the arrangement between the circular member 118 and the linear member 114 may be such that the circular member 118 on being rotated in clockwise direction may engage or disengage the gate 116 with the opening 108 of the housing 106.

FIG. 5A illustrates the system 100 with the gate 116 engaged with the opening 108. With the gate 116 engaged with the opening 108, the opening 108 may be fluidically decoupled from the HVAC vent, and as such, the passage of air from the HVAC vent into the housing 106 via the opening 108 may be blocked. In order to engage the gate 116 with the opening 108, the circular member 118 may be rotated in either clockwise or anticlockwise direction. For example, upon rotating the circular member 118 in clockwise direction, the circular member 118 may cause a downward movement of the linear member 114 (rack and pinion mechanism). This may in turn cause a downward movement of the gate 116, to thereby cause the gate 116 to engage with the opening 108.

It may be desirable that when the gate 116 is engaged with the opening 108, a gate interface of the gate 116 and the opening 108 may be air sealed. In some embodiments, the air sealing at the gate interface between the gate 116 and the opening 108 may be achieved using a tape silencer. For example, the tape silencer may be applied either on a gate surface of the gate 116 or an opening surface of the opening 108. It may be understood that the gate interface may be defined along the contact of the gate surface and the opening surface. However, in some embodiments, the tape silencer may be applied both on the housing surface and the opening surface. For example, a first tape silencer may be applied on the gate surface and a second tape silencer may be applied on the opening surface. It may be noted that the tape silencer may have air sealing properties. It may be further noted that the air sealing may not be limited to tape silencer, and any other mechanism may be used to achieve air sealing.

FIG. 5B illustrates the system 100 with the gate 116 disengaged from the opening 108. With the linear member 114 disengaged from the opening 108, the opening 108 may be fluidically coupled with the HVAC vent, and as such, the passage of air from the HVAC vent into the housing 106 via the opening 108 may be allowed. In order to disengage the gate 116 from the opening 108, the circular member 118 may be rotated in either clockwise or anticlockwise direction. For example, upon rotating the circular member 118 in anticlockwise direction, the circular member 118 may cause an upward movement of the linear member 114. This may in turn cause an upward movement of the gate 116, to thereby cause the gate 116 to disengage from the opening 108.

Figure 6A:
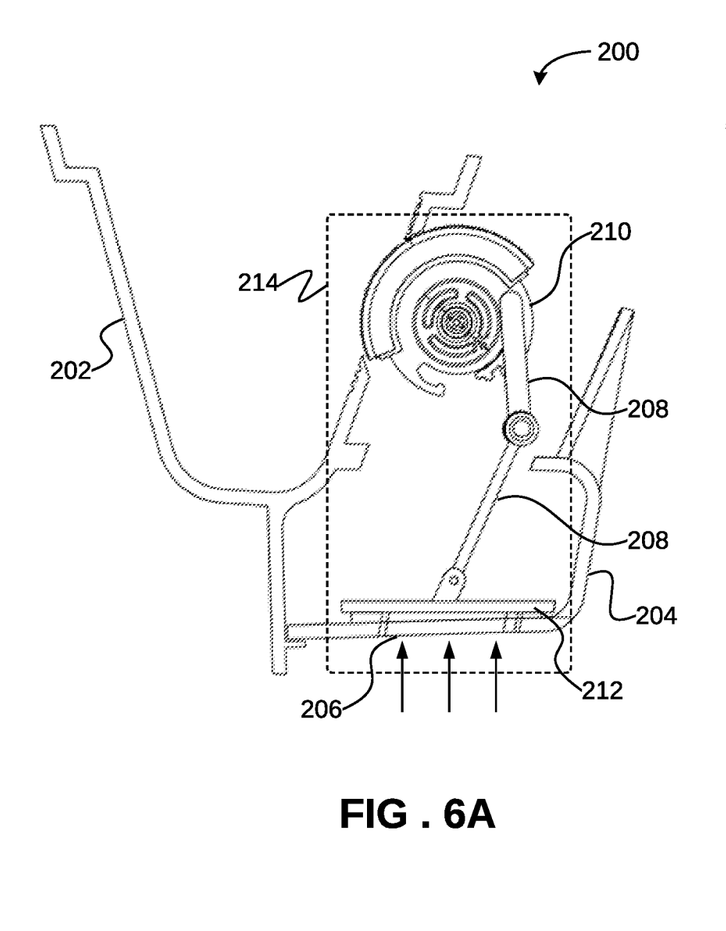
FIGS. 6A-6B illustrate schematic views of a temperature-controlled system, in accordance with some embodiments of the present disclosure.
Figure 6B:
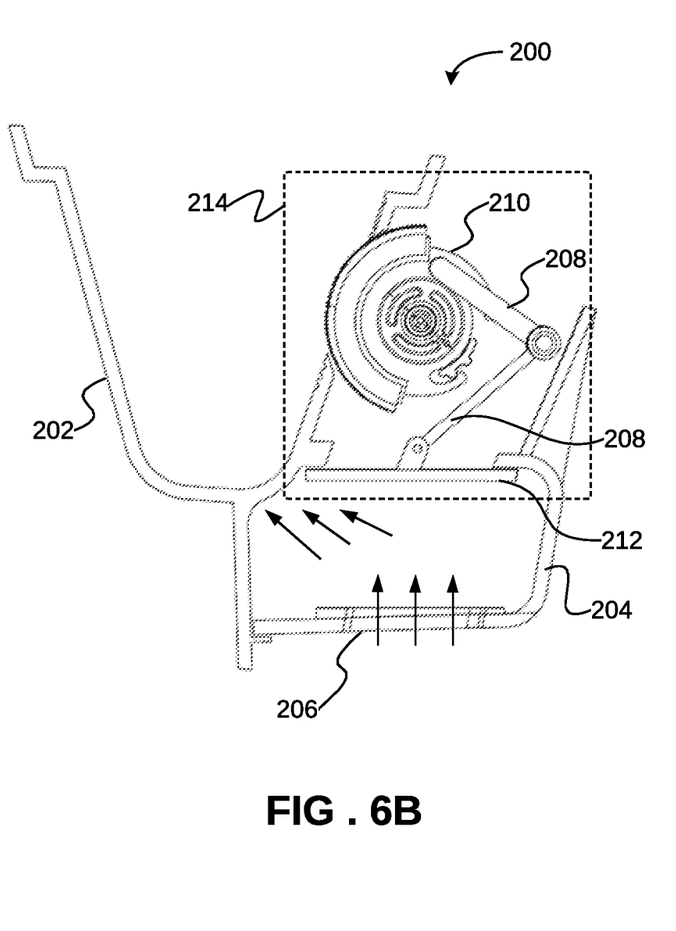

Referring now to FIGS. 6A and 6B, schematic views of a system 200 (analogous to system 100) for controlling temperature inside a receptacle 202 in a vehicle are illustrated, in accordance with some embodiments. The system 200 may include a receptacle 202, a housing 204, and a gate assembly 214. The housing 204 may be configured to be fitted to the receptacle 202. In some embodiments, the housing 204 may be configured to be mounted on to the receptacle 202. The housing 204 may further include an opening 206. The opening 206 may be fluidically coupled to or decoupled from a HVAC vent of the vehicle so as to block or allow passage of hot or cool air from the HVAC vent of the vehicle into the housing 204.

In some embodiments, the gate assembly 214 may be partly enclosed within the housing 204. In some embodiments, the gate assembly 214 may be configured to be mounted on the housing 204. In some embodiments, the gate assembly 214 may include a gate 212 configured to engage or disengage with the opening 206 to fluidically decouple or fluidically couple, respectively, the opening 206 to the HVAC vent. In other words, when the gate 212 is engaged with the opening, the gate may block passage of warm or cool air from the HVAC vent into the housing 204 via the opening 206. Similarly, when the gate 212 is disengaged from the opening 206, the gate 212 may allow passage of warm or cool air from the HVAC vent to the housing 204 via the opening 206.

The gate assembly may include a linear member 208 and a circular member 210. In some embodiments, the linear member 208 and the circular member 210 may form a lever and crank mechanism. The crank may be mechanically coupled to the circular member 210, and the lever may be mechanically coupled to the linear member 208. In alternate embodiments, the circular member 210 may itself be the crank, and the linear member 208 may itself be the levers. In some embodiments, the linear member 208 may include at least two levers 208. The connection between the at least two levers 208 may be a hinged connection.

The circular motion of the circular member 210 may be converted into a linear motion of the linear member 208. The linear member 208 may further have an end 212 which may act as gate 212 (the term end 212 and the term gate 212 are used interchangeably in this disclosure). The gate 212 may engage or disengage with the opening 206 when the circular member 210 is rotated. By engaging or disengaging with the opening 206, the gate 212 may fluidically decouple or fluidically couple, respectively, the opening 206 to the HVAC vent (i.e. block or allow, respectively, the passage of warm or cool air from the HVAC vent into the housing 204).

FIG. 6A shows the system 200 with the receptacle 202 fluidically decoupled from the HVAC vent, in accordance with an embodiment. In this scenario, the gate 212 is engaged with the opening 206. In order to engage the gate 212 with the opening 206, the circular member 210 may be rotated in clockwise or anticlockwise direction. For example, upon rotating the circular member 210 in clockwise direction, the circular member 210 may cause a movement of the linear member 208, which may in turn cause a downward movement of the gate 212 to thereby cause the gate 212 to engage with the opening 206. Upon engaging, the gate 212 may fluidically decouple the opening 206 to the HVAC vent, and thereby block the passage of warm or cool air from the HVAC vent into the housing 204. As a result, the receptacle 202 may fluidically decoupled from the HVAC vent, and no warming or cooling effect is obtained in the receptacle 202.

FIG. 6B shows the system 200 with the receptacle 202 fluidically coupled to the HVAC vent, in accordance with an embodiment. In this scenario, the gate 212 is disengaged from the opening 206. In order to disengage the gate 212 from the opening 206, the circular member 210 may be rotated in clockwise or anticlockwise direction. For example, upon rotating the circular member 210 in anticlockwise direction, the circular member 210 may cause a movement of the linear member 208, which may in turn cause an upward movement of the gate 212 to thereby cause the gate 212 to disengage from the opening 206. Upon disengaging, the gate 212 may fluidically couple the opening 206 to the HVAC vent, and thereby allow the passage of warm or cool air from the HVAC vent into the housing 204. As a result, the receptacle 202 is fluidically coupled to the HVAC vent, and warming or cooling effect is obtained in the receptacle 202.

According to an embodiment, the engagement and the disengagement of the linear member 208 by the rotation of the circular member 210 may be achieved manually by a user. According to another embodiment, the engagement and the disengagement of the linear member 208 by the rotation of the circular member 210 may be achieved by the user through an electric switch.

Figure 7:
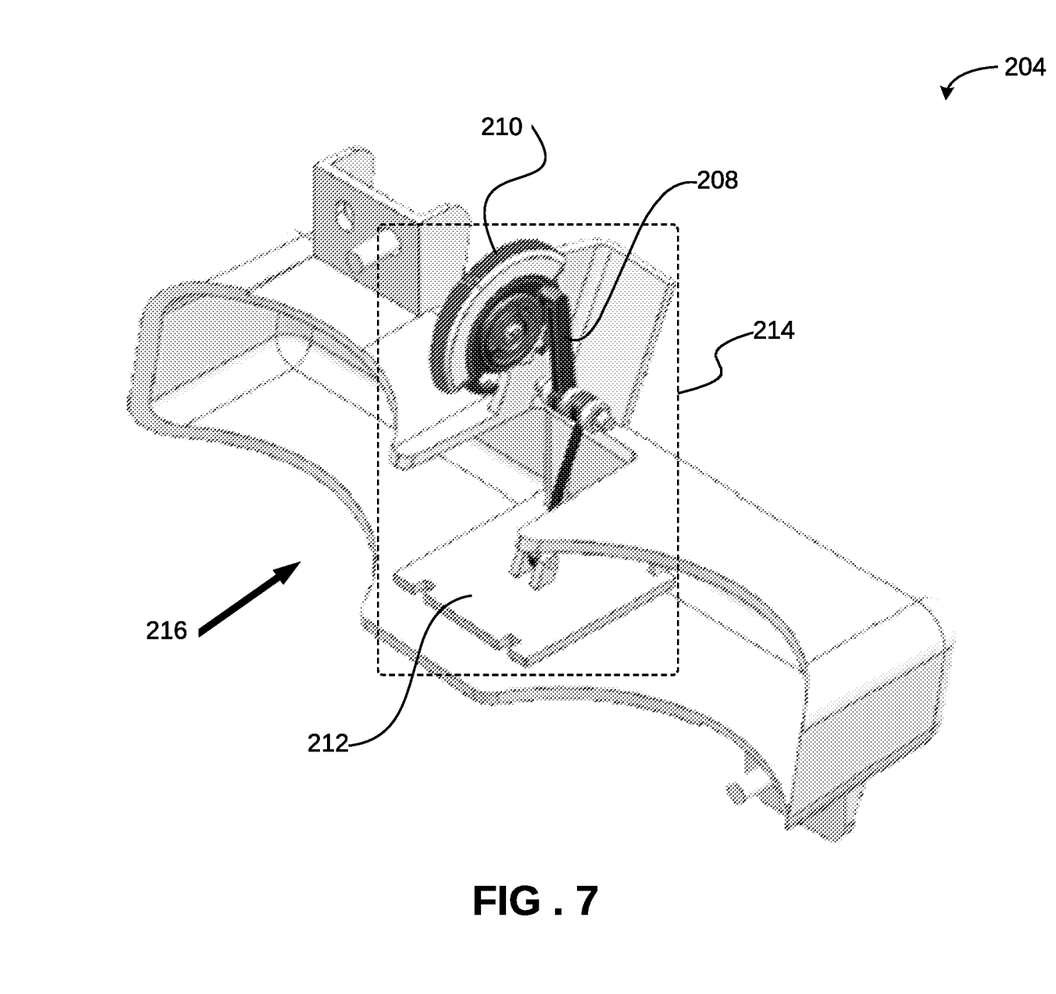
FIG. 7 illustrates a schematic view of a housing for controlling temperature inside a receptacle in a vehicle, in accordance with some embodiments of the present disclosure.

Referring now to FIG. 7, a housing 204 for controlling temperature inside a receptacle (not shown in the FIG. 7) in a vehicle is disclosed. In some embodiments, the housing 204 may include an opening (not shown in the FIG. 7) at a base of the housing 204. The opening may be configured to be fluidically coupled to a heating, ventilation, and air conditioning (HVAC) vent of the vehicle. The housing 204 may further include a gate assembly 214 including a gate 212. The gate 212 may be configured to engage or disengage with the opening to fluidically couple or fluidically decouple, respectively, the opening to the HVAC vent. The housing 204 may further include an open front face 216 configured to be fluidically coupled to at least one inlet of the receptacle. It may be noted that the HVAC vent may be positioned on a HVAC duct extending from the HVAC of the vehicle to a rear vent of the vehicle. The housing may be configured to be retrofitted in a region proximate to the HVAC vent.

In some embodiments, the gate assembly 214 may include a linear member 208 and a circular member 210. The linear member 208 may be configured to move linearly and the circular member 210 may be configured to rotate about an axis. A rotatory motion of the circular member 210 may cause a linear movement of the linear member 208. The linear member 208 may be fixed to the gate 212. Accordingly, a rotatory motion of the circular member 210 may cause a linear movement of the gate 212 to further cause the gate 212 to engage or disengage with the opening to fluidically couple or fluidically decouple, respectively, the opening to the HVAC vent. In some embodiments, the circular member 210 may be rotated using at least one of a manual intervention and an electric switch.

In some embodiments (as shown in the FIG. 7), the gate assembly may include a crank and a lever. The crank may be mechanically coupled to the circular member 210, and the lever may be mechanically coupled to the linear member 208. However, in some embodiments, the crank may itself be circular member 210, and the lever may itself be the linear member 208. In alternate embodiments, the gate assembly 214 may include a rack and a pinion. The rack may be mechanically coupled to the pinion. The rack may be fixed to the linear member, and the pinion may be fixed to the circular member. However, in some embodiments, the rack may itself be the linear member, and the pinion may itself be the circular member.

Figure 8:
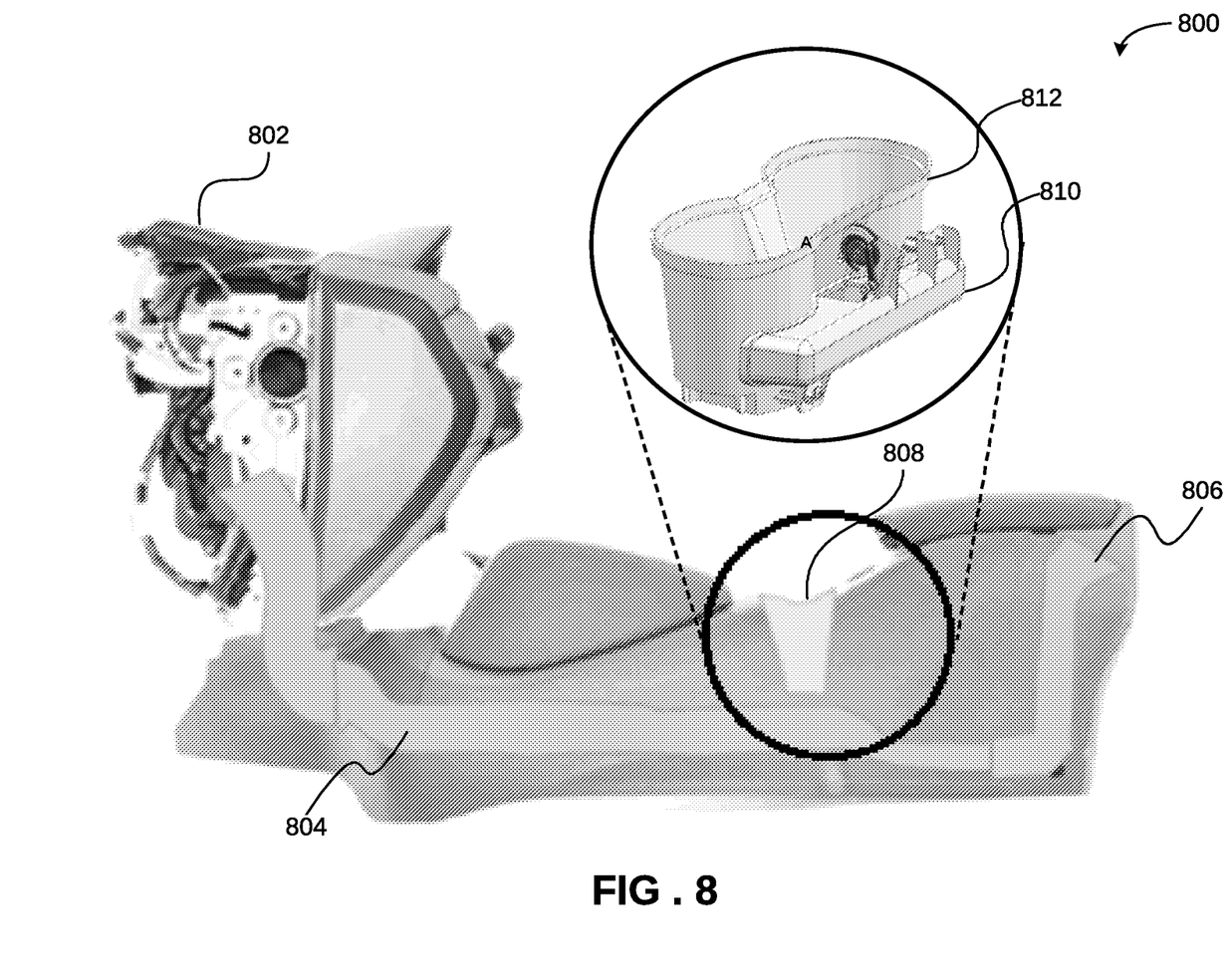
FIG. 8 illustrates a schematic view of a vehicle, in accordance with some embodiments of the present disclosure.

Referring now to FIG. 8, a portion of a vehicle 800 is illustrated, in accordance with an embodiment. The vehicle 800 may include a heating, ventilation, and air conditioning (HVAC) unit 802 and a HVAC duct 804. In some embodiments, the vehicle 800 may further include a rear vent 806 fluidically coupled with the HVAC unit 802 though the HVAC duct 804, for providing cooling or heating in the rear compartment of the vehicle 800. The HVAC duct 804 may include a HVAC vent 808.

The vehicle may further include a housing 810 which may be configured to be coupled to a receptacle 812 for controlling temperature inside the receptacle 812. The housing 810 may include an opening at a base of the housing 810. The opening may be configured to be fluidically coupled to the HVAC vent 808 of the vehicle 800. The housing 810 may further include a gate assembly. The gate assembly may include a gate configured to engage or disengage with the opening to fluidically couple or fluidically decouple, respectively, the opening to the HVAC vent 808. The housing 810 may further include an open front face fluidically coupled to the opening. The open front face may be configured to fluidically couple with the receptacle 812 via at let one inlet of the receptacle 812. The HVAC vent 808 may be positioned on a HVAC duct 804 extending from the HVAC unit 802 to a rear vent 806 of the vehicle 800. As such, the housing 810 may be fitted in a region proximate to the HVAC vent 808.

As will be appreciated by those skilled in the art, the techniques described in the various embodiments discussed above relate to controlling temperature inside a receptacle in a vehicle. The techniques described above provide a convenient solution for equipping receptacles (e.g. cup-holders) with cooling and heating capability using the cooling or warming facility as afforded by an existing HVAC unit of the vehicle. For example, the techniques provide for a housing for controlling temperature inside a receptacle which may be detachably fitted to the housing. The housing may be retrofitted to a vehicle at any suitable position one the HVAC duct of the vehicle. The techniques further provide for a system including the housing and the receptacle as s single unit which may be retrofitted in a vehicle. Further the techniques provide for a vehicle having a capability for controlling temperature inside a receptacle. Further, by manipulating the gate, the techniques provide for selectively controlling the temperature.

It is intended that the disclosure and examples be considered as exemplary only, with a true scope and spirit of disclosed embodiments being indicated by the following claims.

We claim:

1. A housing 106 for controlling temperature inside a receptacle 102 in a vehicle, the housing 106 comprising:
   an opening 108 at a base of the housing 106, wherein the opening 108 is configured to be fluidically coupled to a heating, ventilation, and air conditioning (HVAC) vent of the vehicle, wherein the gate assembly comprises a linear member 114 and a circular member 118;
   a gate assembly comprising a gate 116, wherein the gate 116 is configured to engage or disengage with the opening 108 to fluidically decouple or fluidically couple, respectively, the opening 108 to the HVAC vent; and
   an open front face 110 configured to be fluidically coupled to at least one inlet 104 of the receptacle 102; and
   wherein a rotatory motion of the circular member 118 causes a linear movement of the gate 116 to cause the gate 116 to engage or disengage with the opening 108 to fluidically decouple or fluidically couple, respectively, the opening 108 to the HVAC vent.

2. The housing 106 as claimed in claim 1, wherein the linear member 114 is configured to move linearly and the circular member 118 is configured to rotate about an axis, and wherein a rotatory motion of the circular member 118 causes a linear movement of the linear member 114.

3. The housing 106 as claimed in claim 2, wherein the gate assembly comprises a rack and a pinion, wherein the rack is mechanically coupled to the pinion, and wherein the rack is fixed to the linear member 114, and the pinion is fixed to the circular member 118.

4. The housing as claimed in claim 2, wherein the gate assembly comprises a crank and a lever, wherein the crank is mechanically coupled to the circular member 210, and the lever is mechanically coupled to the linear member 208.

5. The housing 106 as claimed in claim 2, wherein the circular member 118 is rotated using at least one of: a manual intervention or an electric switch.

6. The housing 106 as claimed in claim 1, wherein the HVAC vent is positioned on a duct extending from the HVAC of the vehicle to a rear vent of the vehicle, and wherein the housing 106 is configured to be retrofitted in a region proximate to the HVAC vent.

7. A temperature-controlled system for a vehicle, wherein the temperature-controlled system comprises:
   a receptacle 102 having at least one inlet 104;
   a housing 106 fitted to the receptacle 102, the housing 106 comprising:
   an opening 108 at a base of the housing 106, wherein the opening 108 is configured to be fluidically coupled to a heating, ventilation, and air conditioning (HVAC) vent of the vehicle, wherein the gate assembly comprises a linear member 114 and a circular member 118; and
   an open front face 110 fluidically coupled to the at least one inlet 104 of the receptacle 102; and
   a gate assembly mounted on the housing 106, wherein a rotatory motion of the circular member 118 causes a linear movement of the gate 116 to cause the gate 116 to engage or disengage with the opening 108 to fluidically decouple or fluidically couple, respectively, the opening 108 to the HVAC vent.

8. The temperature controlled system as claimed in 7, wherein the linear member 114 is mechanically coupled to the circular member 118, wherein the linear member 114 is configured to move linearly and the circular member 118 is configured to rotate about an axis, and wherein a rotatory motion of the circular member 118 causes a linear movement of the linear member 114.

9. The temperature-controlled system as claimed in claim 8, wherein the gate assembly comprises one of:
   a rack and a pinion, wherein the rack is mechanically coupled to the pinion, and wherein the rack is the linear member 114 and the pinion is the circular member 118; or
   a crank and a lever, wherein the crank is the circular member 210 and the lever is the linear member 208.

10. The temperature-controlled system as claimed in claim 8, wherein the circular member 118 is configured to be rotated using at least one of: a manual intervention or an electric switch.

11. The temperature-controlled system as claimed in claim 7, wherein the receptacle is a cup holder.

12. The temperature controlled system as claimed in claim 7, wherein the HVAC vent is positioned on a duct extending from the HVAC of the vehicle to a rear vent of the vehicle, and wherein the housing 106 is configured to be retrofitted in a region proximate to the HVAC vent.

13. A vehicle 800 comprising:
   a housing 810 configured to be coupled to a receptacle 812 for controlling temperature inside the receptacle 812, the housing 810 comprising:
      an opening at a base of the housing 810, wherein the opening is configured to be fluidically coupled to a heating, ventilation, and air conditioning (HVAC) vent 808 of the vehicle 800, wherein the gate assembly comprises a linear member 114 and a circular member 118;
   a gate assembly, wherein the gate assembly comprises a gate configured to engage or disengage with the opening to fluidically decouple or fluidically couple, respectively, the opening to the HVAC vent 808; and
   an open front face fluidically coupled to the opening, wherein the open front face is configured to fluidically couple with the receptacle 812 via at let least one inlet 104 of the receptacle 812; and
   wherein a rotatory motion of the circular member 118 causes a linear movement of the gate 116 to cause the gate 116 to engage or disengage with the opening 108 to fluidically decouple or fluidically couple, respectively, the opening 108 to the HVAC vent.

14. The vehicle 800 as claimed in claim 13, wherein the HVAC vent 808 is positioned on a HVAC duct 804 extending from a HVAC unit 802 of the vehicle 800 to a rear vent 806 of the vehicle 800, and wherein the housing 810 is fitted in a region proximate to the HVAC vent 808.

* * * * *